United States Patent
Enari

(10) Patent No.: US 11,440,253 B2
(45) Date of Patent: Sep. 13, 2022

(54) PLASTICIZATION DEVICE, THREE-DIMENSIONAL MODELING DEVICE, AND INJECTION MOLDING DEVICE

(71) Applicant: Seiko Epson Corporation, Tokyo (JP)

(72) Inventor: Megumi Enari, Shiojiri (JP)

(73) Assignee: Seiko Epson Corporation

( * ) Notice: Subject to any disclaimer, the term of this patent is extended or adjusted under 35 U.S.C. 154(b) by 155 days.

(21) Appl. No.: 16/857,597

(22) Filed: Apr. 24, 2020

(65) Prior Publication Data
US 2020/0338823 A1   Oct. 29, 2020

(30) Foreign Application Priority Data
Apr. 25, 2019 (JP) .............................. JP2019-083767

(51) Int. Cl.
*B29C 64/209* (2017.01)
*B33Y 30/00* (2015.01)
*B29C 45/47* (2006.01)

(52) U.S. Cl.
CPC ............ *B29C 64/209* (2017.08); *B29C 45/47* (2013.01); *B33Y 30/00* (2014.12)

(58) Field of Classification Search
CPC ........ B29C 48/52; B29C 48/47; B29C 48/535
See application file for complete search history.

(56) References Cited

U.S. PATENT DOCUMENTS

| 2,695,246 A | * | 11/1954 | Jurgensen, Jr. | ....... B29B 7/7414 261/92 |
| 3,009,685 A | * | 11/1961 | Rettig | ..................... B29C 48/76 165/92 |
| 3,046,603 A | * | 7/1962 | Maxwell | ................. B29C 48/10 264/211.1 |

(Continued)

FOREIGN PATENT DOCUMENTS

| JP | S62-018236 A | 1/1987 |
| JP | 2009-269182 A | 11/2009 |

(Continued)

*Primary Examiner* — Niki Bakhtiari
*Assistant Examiner* — Emmanuel S Luk
(74) *Attorney, Agent, or Firm* — Harness, Dickey & Pierce, P.L.C.

(57) ABSTRACT

A plasticization device includes a screw configured to rotate around a rotation axis and including a groove forming surface on which a groove channel in which a groove extends spirally is formed; a heating unit configured to heat the material supplied to the groove channel; and a barrel including a facing surface that faces the groove forming surface and that is provided with a discharge port through which the molten material is to be discharged due to rotation of the screw and due to heating of the heating unit. The groove is defined by a first side wall portion, a second side wall portion provided at a position farther from the rotation axis than the first side wall portion, and a bottom surface portion coupled between the first side wall portion and the second side wall portion. The groove of the groove channel has an interval between the first side wall portion and the (Continued)

second side wall portion that becomes narrower as a distance from the bottom surface portion along the rotation axis increases.

15 Claims, 8 Drawing Sheets

(56) References Cited

U.S. PATENT DOCUMENTS

| | | | | |
|---|---|---|---|---|
| 3,082,476 A | * | 3/1963 | Bunch | B29C 48/47 425/200 |
| 3,253,300 A | * | 5/1966 | Gove | B29C 48/47 366/144 |
| 3,277,528 A | * | 10/1966 | Nikiforov | B29C 48/46 415/74 |
| 3,689,181 A | * | 9/1972 | Maxwell | B29C 48/46 425/207 |
| 3,712,783 A | * | 1/1973 | Maxwell | B29C 48/46 425/381.2 |
| 3,829,270 A | * | 8/1974 | DeBonth | B29C 48/47 425/207 |
| 4,400,236 A | * | 8/1983 | Hanamura | C08F 6/00 159/DIG. 10 |
| 5,975,440 A | * | 11/1999 | Watson | B01F 27/2712 241/261.3 |
| 6,146,575 A | * | 11/2000 | Huston | F04C 13/002 425/270 |
| 10,583,604 B2 | * | 3/2020 | Yuyama | B33Y 50/02 |
| 10,836,077 B2 | * | 11/2020 | Andrews | B29C 48/05 |
| 10,875,288 B2 | * | 12/2020 | Chapiro | B29C 64/118 |
| 2017/0210069 A1 | | 7/2017 | Stubenruss | |
| 2020/0031037 A1 | * | 1/2020 | Hideshima | B29C 45/60 |

FOREIGN PATENT DOCUMENTS

| | | |
|---|---|---|
| JP | 2009-285879 A | 12/2009 |
| JP | 2010-000752 A | 1/2010 |
| JP | 2011-020378 A | 2/2011 |
| JP | 2012-131115 A | 7/2012 |
| JP | 2017-523934 A | 8/2017 |
| WO | 2007/119533 A1 | 10/2007 |

* cited by examiner though the present application is based on, and claims priority

PLASTICIZATION DEVICE, THREE-DIMENSIONAL MODELING DEVICE, AND INJECTION MOLDING DEVICE

The present application is based on, and claims priority from JP Application Serial Number 2019-083767, filed Apr. 25, 2019, the disclosure of which is hereby incorporated by reference herein in its entirety.

BACKGROUND

1. Technical Field

The present disclosure relates to a plasticization device, a three-dimensional modeling device, and an injection molding device.

2. Related Art

For example, JP-A-2009-269182 describes a device including a rotor in which a spiral groove is formed and a barrel facing the rotor and having an opening portion formed in a center. In the device, the rotor is rotated to plasticize a material supplied in the spiral groove and to pump the material from the opening portion of the barrel.

As in the device described above, in a device that plasticizes and pumps a material using relative rotation between a screw and a barrel, for example, due to a tolerance or the like, a gap is created between the barrel and side walls defining a groove of the screw, and therefore a part of the plasticized material flows backward through the gap. When an amount of the material that flows backward increases, a necessary pressure may not be obtained, and the pumping of the material from the device may become unstable.

SUMMARY

According to an aspect of the present disclosure, a plasticization device configured to plasticize a material into a molten material is provided. The plasticization device includes a screw configured to rotate around a rotation axis and including a groove forming surface on which a groove channel in which a groove extends spirally is formed; a heating unit configured to heat the material supplied to the groove channel; and a barrel including a facing surface that faces the groove forming surface and that is provided with a discharge port through which the molten material is to be discharged due to rotation of the screw and due to heating of the heating unit. The groove is defined by a first side wall portion, a second side wall portion provided at a position farther from the rotation axis than the first side wall portion, and a bottom surface portion coupled between the first side wall portion and the second side wall portion. The groove of the groove channel has an interval between the first side wall portion and the second side wall portion that becomes narrower as a distance from the bottom surface portion along the rotation axis increases.

DESCRIPTION OF EXEMPLARY EMBODIMENTS

A. First Embodiment

Figure 1:
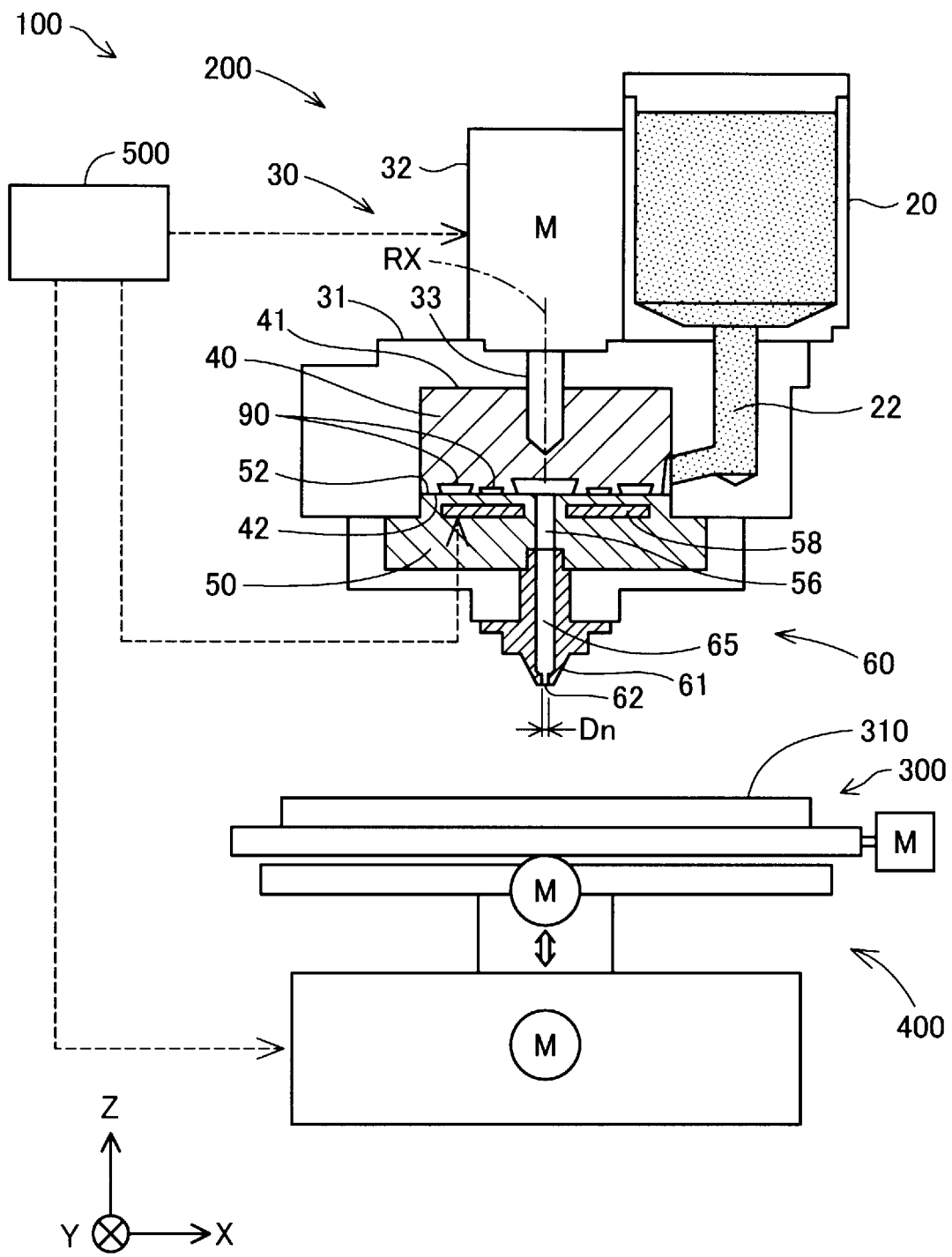
FIG. 1 is a schematic view showing a schematic configuration of a three-dimensional modeling device according to a first embodiment.

FIG. 1 is a schematic view showing a schematic configuration of a three-dimensional modeling device 100 according to a first embodiment. FIG. 1 shows arrows along X, Y, and Z directions which are orthogonal to each other. The X direction and the Y direction are directions along a horizontal direction, and the Z direction is a direction along a vertical direction. In other diagrams, the arrows along the X, Y, and Z directions are shown appropriately. The X, Y, and Z directions in FIG. 1 represent the same directions as the X, Y, and Z directions in other diagrams.

The three-dimensional modeling device 100 according to the present embodiment includes a modeling unit 200, a stage 300, a moving mechanism 400, and a control unit 500. Under control of the control unit 500, the three-dimensional modeling device 100 models a three-dimensional modeled object having a desired shape on a modeling surface 310 by discharging a modeling material from a nozzle 61 provided on the modeling unit 200 toward the modeling surface 310 of the stage 300 while driving the moving mechanism 400 to change a relative position between the nozzle 61 and the modeling surface 310.

The moving mechanism 400 changes the relative position between the nozzle 61 and the modeling surface 310. In the present embodiment, the moving mechanism 400 changes the relative position between the nozzle 61 and the modeling surface 310 by moving the stage 300 with respect to the modeling unit 200. The moving mechanism 400 according to the present embodiment is configured with a three-axis positioner that moves the stage 300 in three directions which are the X, Y, and Z directions with driving forces of three motors. Each motor is driven under the control of the control unit 500. The moving mechanism 400 may be configured to change the relative position between the nozzle 61 and the modeling surface 310 by moving the modeling unit 200 without moving the stage 300, instead of being configured to move the stage 300. In addition, the moving mechanism 400 may be configured to change the relative position between the nozzle 61 and the modeling surface 310 by moving both the stage 300 and the modeling unit 200.

The control unit 500 is configured with a computer including one or more processors, a main storage device, and an input and output interface for inputting and outputting signals to and from an outside. In the present embodiment, the control unit 500 controls operations of the modeling unit 200 and the moving mechanism 400 by executing with the processor a program or a command read on the main storage device, so as to perform a modeling process for modeling the three-dimensional modeled object. The operations include a movement of a three-dimensional relative position between the modeling unit 200 and the stage 300. The control unit 500 may be configured with a combination of a plurality of circuits instead of the computer.

The modeling unit 200 includes a material supply unit 20 which is a material supply source, a plasticization unit 30 that plasticizes the material supplied from the material supply unit 20 into a modeling material, and a discharge unit including the nozzle 61 that discharges the modeling material supplied from the plasticization unit 30. The "plasticization" means that a thermoplastic material is heated and melted. In addition, "melt" means that the thermoplastic material is heated to a temperature equal to or higher than a glass transition point thereof so as to be softened, thereby exhibiting fluidity. The plasticization unit 30 may also be referred to as a plasticization device.

A material in a state of pellets, powder, or the like is accommodated in the material supply unit 20. In the present embodiment, an ABS resin formed in the pellet shape is used as the material. The material supply unit 20 according to the present embodiment is configured with a hopper. A supply passage 22 that couples the material supply unit 20 and the plasticization unit 30 is provided below the material supply unit 20. The material supply unit 20 supplies the material to the plasticization unit 30 through the supply passage 22.

The plasticization unit 30 includes a screw case 31, a drive motor 32, a flat screw 40, and a barrel 50. The plasticization unit 30 melts at least a part of the material in a solid state supplied from the material supply unit 20 to form a modeling material with a paste shape having fluidity, and supplies the modeling material to the discharge unit 60. The flat screw 40 may be simply referred to as the screw.

The screw case 31 is a housing that houses the flat screw 40. The barrel 50 is fixed to a lower surface of the screw case 31, and the flat screw 40 is accommodated in a space surrounded by the screw case 31 and the barrel 50. The drive motor 32 is fixed to an upper surface of the screw case 31. A shaft 33 of the drive motor 32 is coupled to an upper surface 41 side of the flat screw 40. The drive motor 32 is driven under the control of the control unit 500.

The flat screw 40 has a substantially columnar shape whose height in a direction along a central axis RX is smaller than a diameter thereof. The flat screw 40 is disposed in the screw case 31 such that the central axis RX is parallel to the Z direction. The flat screw 40 rotates around the central axis RX in the screw case 31 due to a torque generated by the drive motor 32. The central axis RX may be referred to as the rotation axis.

The flat screw 40 includes a groove forming surface 42 on which a groove portion 90 is formed on a side opposite to the upper surface 41 in the direction along the central axis RX. A specific configuration of the groove portion 90 will be described later.

The barrel 50 is disposed below the flat screw 40. The barrel 50 includes a screw facing surface 52 that faces the groove forming surface 42 of the flat screw 40. The barrel 50 is provided with a discharge port 56 communicating with the discharge unit 60 on the central axis RX of the flat screw 40. The modeling material is supplied to the discharge unit 60 from the discharge port 56. A specific configuration of the screw facing surface 52 will be described later.

A heater 58 is built in the barrel 50 at a position facing the groove portion 90 of the flat screw 40. A temperature of the heater 58 is controlled by the control unit 500. In the present embodiment, the heater 58 is disposed such that temperature of the groove portion 90 on a central axis RX side is higher than temperature of the groove 90 on an outer peripheral side of the flat screw 40. Therefore, the material can be effectively conveyed into the groove portion 90 on the outer peripheral side of the flat screw 40, and the material can be effectively plasticized in the groove 90 on the central axis RX side. The heater 58 may be referred to as the heating unit. The heater 58 may be built in the flat screw 40 instead of the barrel 50.

The discharge unit 60 includes a supply flow passage through which the modeling material supplied from plasticization unit 30 flows, and a nozzle 61 that discharges the modeling material flowing through the supply flow passage 65. In the present embodiment, the nozzle 61 is coupled to the discharge port 56 of the barrel 50. Therefore, the supply flow passage 65 is provided in the nozzle 61. The nozzle 61 is provided with a nozzle hole 62 which is an opening portion for discharging the modeling material. The nozzle hole 62 is provided at a distal end portion of the nozzle 61 facing the modeling surface 310 of the stage 300. The discharge port 56 of the barrel 50 and the nozzle hole 62 are coupled by the supply flow passage 65. An opening shape of the nozzle hole 62 is circular. A diameter of the nozzle hole 62 is smaller than a diameter of the supply flow passage 65. The opening shape of the nozzle hole 62 is not limited to a circle, and may be a square or the like.

Figure 2:
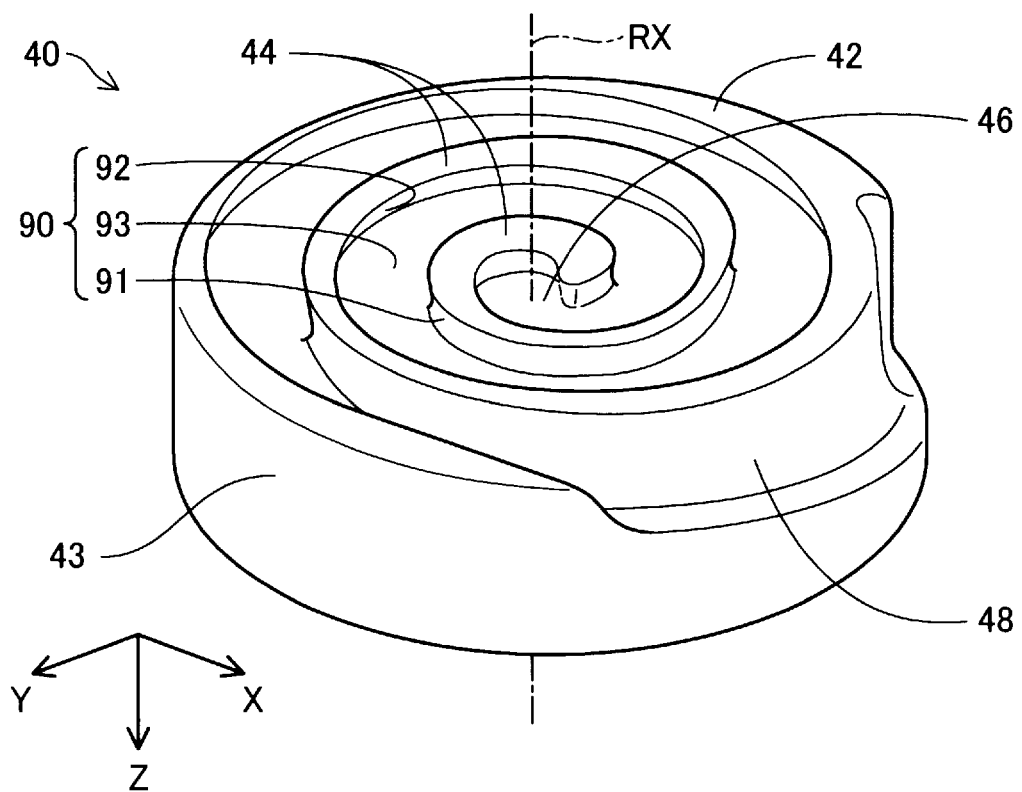
FIG. 2 is a perspective view showing a configuration of a groove forming surface of a flat screw according to the first embodiment.

FIG. 2 is a perspective view showing a configuration of the groove forming surface 42 of the flat screw 40 according to the present embodiment. In order to facilitate understanding of the technique, the flat screw 40 shown in FIG. 2 is shown in a state in which an upper and lower positional relationship shown in FIG. 1 is reversed. The groove forming surface 42 of the flat screw 40 is provided with a central portion 46, the groove portion 90, and a material introduction port 48. The central portion 46 is an indentation formed around the central axis RX of the flat screw 40. The central portion 46 faces the discharge port 56 of the barrel 50.

The groove portion 90 is a portion in which the groove extending spirally is formed such that an arc is drawn centered on the central axis RX of the flat screw 40 toward an outer periphery of the groove forming surface 42. A groove of the groove portion 90 may be configured to extend in an involute curve shape or a spiral shape. The groove portion 90 is defined by a first side wall portion 91, a second side wall portion 92 facing the first side wall portion 91 and arranged away from the central axis RX than the first side wall portion 91, and a bottom surface portion 93 sandwiched between the first side wall portion 91 and the second side wall portion 92. One end of the groove portion 90 is coupled to the central portion 46, and the other end of the groove portion 90 is coupled to the material introduction port 48. The groove portion 90 has a function as a channel for conveying the material from the material introduction port 48 toward the central portion 46. A portion that separates adjacent channels of the groove portion 90 is referred to as a ridge portion 44.

The material introduction port 48 is provided on a side surface 43 of the flat screw 40. The material introduction port 48 introduces the material supplied from the material supply unit 20 through the supply passage 22 into the groove portion 90. FIG. 2 shows an aspect in which one groove portion 90 is provided from the central portion 46 of the flat screw 40 toward the outer periphery, whereas a plurality of groove portions 90 may be provided from the central portion 46 of the flat screw 40 toward the outer periphery.

Figure 3:
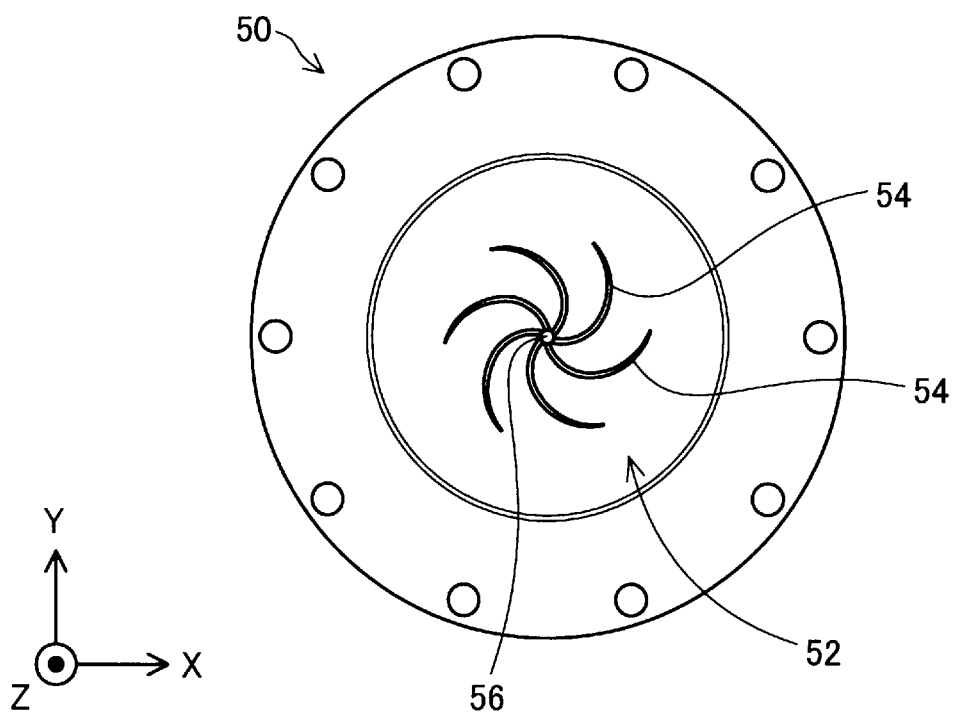
FIG. 3 is a top view showing a configuration of a facing surface of a barrel according to the first embodiment.

FIG. 3 is a top view showing a configuration of the screw facing surface 52 of the barrel 50 according to the present embodiment. As described above, the discharge port 56 communicating with the discharge unit 60 is formed at a center of the screw facing surface 52. A plurality of guide grooves 54 are formed around the discharge port 56 in the screw facing surface 52. Each guide groove 54 has one end coupled to the discharge port 56, and extends spirally from the discharge port 56 toward the outer periphery of the screw facing surface 52. Each of the guide grooves 54 has a function of guiding the modeling material to the discharge port 56.

Figure 4:
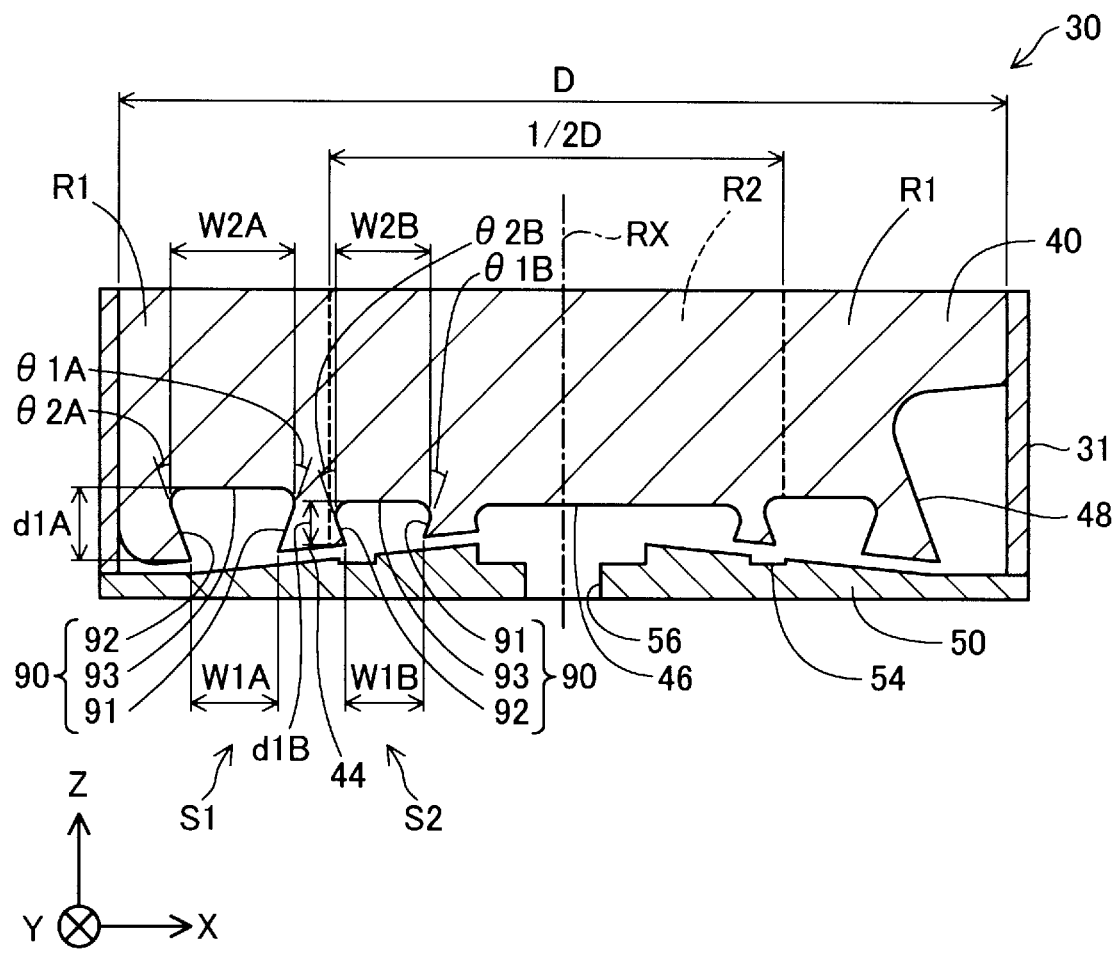
FIG. 4 is a cross-sectional view showing a configuration of a plasticization unit according to the first embodiment.

FIG. 4 is a cross-sectional view of the plasticization unit 30. FIG. 4 shows a cross section passing through the central axis RX of the flat screw 40. As described above, the groove of the groove portion 90 is defined by the first side wall portion 91, the second side wall portion 92, and the bottom surface portion 93. An interval in a direction perpendicular to the central axis RX between the first side wall portion 91 and the second side wall portion 92 facing each other is called a groove width, and a depth from the groove forming surface 42 to the bottom surface portion 93 in the direction along the central axis RX is called a groove depth.

The groove width of the groove portion 90 decreases as a distance from the bottom surface portion 93 toward a barrel 50 side increases. In the present embodiment, the first side wall portion 91 is provided to be inclined with respect to the central axis RX so as to be more distant from the central axis RX as the distance from the bottom surface portion 93 toward the barrel 50 side increases. The second side wall portion 92 is provided to be inclined with respect to the central axis RX so as to approach the central axis RX as the distance from the bottom surface portion 93 toward the barrel 50 side increases. That is, the first side wall portion 91 and the second side wall portion 92 facing the first side wall portion 91 are inclined in opposite directions with respect to the central axis RX. Therefore, the groove width of the groove portion 90 becomes a minimum groove width in the vicinity of the groove forming surface 42 and becomes a maximum groove width in the vicinity of the bottom surface portion 93. For example, in a portion S1 of the groove portion 90 shown in FIG. 4, the groove width of the groove portion 90 becomes a minimum groove width W1A in the vicinity of the groove forming surface 42 and becomes a maximum groove width W2A in the vicinity of the bottom surface portion 93. In a portion S2 of the groove portion 90 shown in FIG. 4, the groove width of the groove portion 90 becomes a minimum groove width W1B in the vicinity of the groove forming surface 42 and becomes a maximum groove width W2B in the vicinity of the bottom surface portion 93.

In the present embodiment, as described above, the first side wall portion 91 and the second side wall portion 92 are inclined in opposite directions with respect to the central axis RX. A magnitude of an inclination angle of the first side wall portion 91 with respect to the central axis RX is set to be the same as a magnitude of an inclination angle of the second side wall portion 92 with respect to the central axis RX. For example, in the portion S1, a magnitude θ1A of the inclination angle of the first side wall portion 91 with respect to the central axis RX is set to be the same as a magnitude θ2A of the inclination angle of the second side wall portion 92 with respect to the central axis RX. In the portion S2, a magnitude θ1B of the inclination angle of the first side wall portion 91 with respect to the central axis RX is set to be the same as a magnitude θ2B of the inclination angle of the second side wall portion 92 with respect to the central axis RX. The magnitude of the inclination angle may be referred to as the degree of inclination.

In the present embodiment, the magnitude of the inclination angle of the first side wall portion 91 with respect to the central axis RX is set to increase as approaching the central axis RX along a path of the groove portion 90. The magnitude of the inclination angle of the second side wall portion 92 with respect to the central axis RX is set to increase as approaching the central axis RX along the path of the groove portion 90. Therefore, the magnitude θ1B of the inclination angle of the first side wall portion 91 with respect to the central axis RX at the portion S2 is larger than the magnitude θ1A of the inclination angle of the first side wall portion 91 with respect to the central axis RX at the portion S1. The magnitude θ2B of the inclination angle of the second side wall portion 92 with respect to the central axis RX at the portion S2 is larger than the magnitude θ2A of the inclination angle of the second side wall portion 92 with respect to the central axis RX at the portion S1.

In the present embodiment, the first side wall portion 91 and the second side wall portion 92 are provided such that the groove width becomes continuously narrower as approaching the central axis RX along the path of the groove portion 90. Therefore, the minimum groove width W1B at the portion S2 is smaller than the minimum groove width W1A at the portion S1 where a distance from the central axis RX is larger than that from the portion S2, and the maximum groove width W2B at the portion S2 is smaller than the maximum groove width W2A at the portion S1.

In the present embodiment, the bottom surface portion 93 is provided such that the groove depth becomes continuously shallower as approaching the central axis RX along the path of the groove portion 90. Therefore, a maximum groove depth d1B at the portion S2 is shallower than a maximum groove depth d1A at the portion S1, which is away from the central axis RX than the portion S2.

The flat screw 40 includes an inner peripheral portion R2, which is a cylindrical portion centered on the central axis RX, and an outer peripheral portion R1, which is a cylindrical portion surrounding the inner peripheral portion R2. In FIG. 4, a boundary line between the outer peripheral portion R1 and the inner peripheral portion R2 is shown with a broken line. A diameter of the inner peripheral portion R2 is half a diameter D of the entire flat screw 40. In the present embodiment, the first side wall portion 91 located in the inner peripheral portion R2 is provided to be inclined with respect to the central axis RX so as to be more distant from the central axis RX as the distance from the bottom surface portion 93 toward the barrel 50 side increases. The first side wall portion 91 located in the outer peripheral portion R1 is provided to be inclined with respect to the central axis RX so as to be more distant from the central axis RX as the distance from the bottom surface portion 93 toward the barrel 50 side increases. That is, in the present embodiment, both the first side wall portion 91 located in the inner peripheral portion R2 and the first side wall portion 91 located in the outer peripheral portion R1 are provided to be inclined with respect to the central axis RX so as to be more distant from the central axis RX as the distance from the bottom surface portion 93 toward the barrel 50 side increases. In addition, in the present embodiment, the second side wall portion 92 located in the inner peripheral portion R2 is provided to be inclined with respect to the central axis RX so as to approach the central axis RX as the distance from the bottom surface portion 93 toward the barrel 50 side increases. The second side wall portion 92 located in the outer peripheral portion R1 is provided to be inclined with respect to the central axis RX so as to approach the central axis RX as the distance from the bottom surface portion 93 toward the barrel 50 side increases. That is, in the present embodiment, both the second side wall portion 92 located in the inner peripheral portion R2 and the second side wall portion 92 located in the outer peripheral portion R1 are provided to be inclined with respect to the central axis RX so as to approach the central axis RX as the distance from the bottom surface portion 93 toward the barrel 50 side increases.

In the flat screw 40, the first side wall portion 91, the second side wall portion 92, and the bottom surface portion 93 may be provided such that the minimum groove width is larger than the maximum groove depth. For example, in the portion S1, the first side wall portion 91, the second side wall portion 92, and the bottom surface portion 93 may be provided such that the minimum groove width W1A is larger than the maximum groove depth d1A. In the portion S2, the first side wall portion 91, the second side wall portion 92, and the bottom surface portion 93 may be provided such that the minimum groove width W1B is larger than the maximum groove depth d1B. By providing the first side wall portion 91, the second side wall portion 92, and the bottom surface portion 93 in this way, a flow passage resistance in the groove portion 90 can be set large. By setting a large flow passage resistance in the groove portion 90, backflow of the modeling material along the path of the groove portion 90 can be prevented, and therefore a pressure of the modeling material in the central portion 46 can be effectively increased.

In the present embodiment, a material of the flat screw 40 is stainless steel. The material of the flat screw 40 may be another metal material such as brass or titanium alloy, a resin material, or a ceramic material. For example, the flat screw 40 including the groove portion 90 described above can be manufactured by cutting using an end mill. The flat screw 40 including the groove portion 90 described above may be manufactured by modeling using a three-dimensional modeling device.

Figure 5:
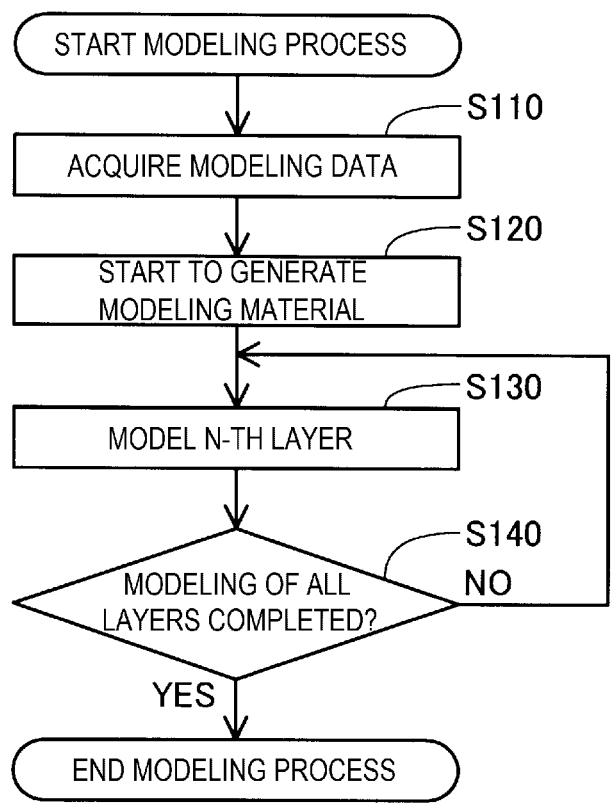
FIG. 5 is a flowchart showing a content of a modeling process.

FIG. 5 is a flowchart showing a content of the modeling process according to the present embodiment. The process is performed by the control unit 500 when a user performs a predetermined start operation on an operation panel provided in the three-dimensional modeling device 100 or a computer coupled to the three-dimensional modeling device 100.

First, in step S110, the control unit 500 acquires modeling data for modeling a three-dimensional modeled object OB. The modeling data is data showing information relating to a moving path of the nozzle 61 with respect to the modeling surface 310 of the stage 300, an amount of the modeling material discharged from the nozzle 61, rotational speed of the drive motor 32 for rotating the flat screw 40, a temperature of heater 58 built in the barrel 50, and the like. The modeling data is generated by, for example, slicer software installed in the computer which is coupled to the three-dimensional modeling device 100. The slicer software reads shape data showing a shape of the three-dimensional modeled object OB that is generated using three-dimensional CAD software or three-dimensional CG software, divides the shape of the three-dimensional modeled object OB into layers with a predetermined thickness, and generates the modeling data. The shape data read by the slicer software is data of an STL format, an AMF format, or the like. The modeling data generated by the slicer software is shown with a G code, an M code, or the like. The control unit 500 acquires the modeling data from the computer coupled to the three-dimensional modeling device 100 or a recording medium such as a USB memory.

Next, in step S120, the control unit 500 starts to generate the modeling material. The control unit 500 controls rotation of the flat screw 40 and the temperature of the heater 58 in accordance with the modeling data to plasticize the material to generate the modeling material. Due to rotation of the flat screw 40, the material supplied from the material supply unit 20 is introduced into the groove portion 90 from the material introduction port 48 of the flat screw 40. The material introduced into the groove portion 90 is conveyed to the central portion 46 along the path of the groove portion 90. At least a part of the material conveyed in the groove portion 90 is melted by a shear caused due to relative rotation between the flat screw 40 and the barrel 50 and heating of the heater 58 and becomes the modeling material with a paste shape having fluidity. The modeling material collected in the central portion 46 is pumped from the discharge port 56 to the nozzle 61. The modeling material is continuously generated while the process is performed.

Figure 6:
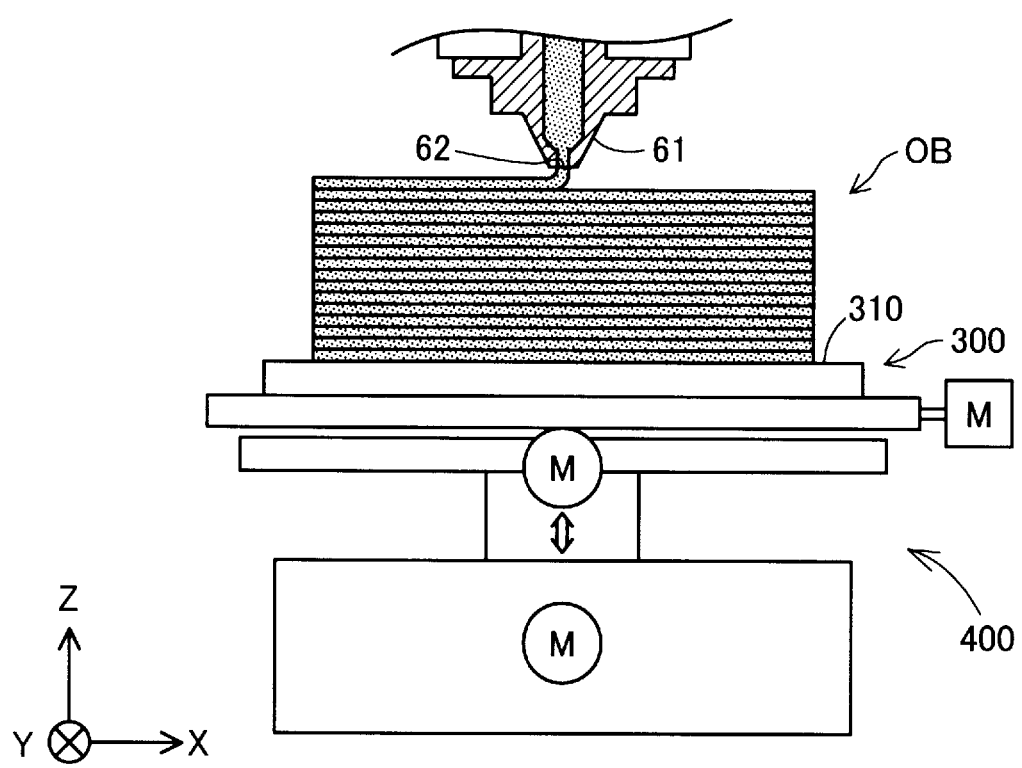
FIG. 6 is a schematic view schematically showing a state in which a three-dimensional modeled object is modeled.

FIG. 6 is schematic view schematically showing a state in which the three-dimensional modeled object OB is modeled. With reference to FIGS. 5 and 6, in step S130, the control unit 500 models a first layer of the three-dimensional modeled object OB by controlling the moving mechanism 400 in accordance with the modeling data to change the relative position between the nozzle 61 and the modeling surface 310 of the stage 300 while discharging the modeling material from the nozzle 61 toward the modeling surface 310. Thereafter, in step S140, the control unit 500 determines whether the modeling of all layers of the three-dimensional modeled object OB is completed. The control unit 500 can determine, using the modeling data, whether the modeling of all layers of the three-dimensional modeled object OB is completed. In step S140, when it is not determined that the modeling of all layers of the three-dimensional modeled object OB is completed, the control unit 500 returns the process to step S130 to model a second layer of the three-dimensional modeled object OB. On the other hand, in step S140, when it is determined that the modeling of all layers of the three-dimensional modeled object OB is completed, the control unit 500 ends the process. The control unit 500 models the three-dimensional modeled object OB by repeating the process of step S130 until it is determined that the modeling of all layers of the three-dimensional modeled object OB is completed in step S140.

Figure 7:
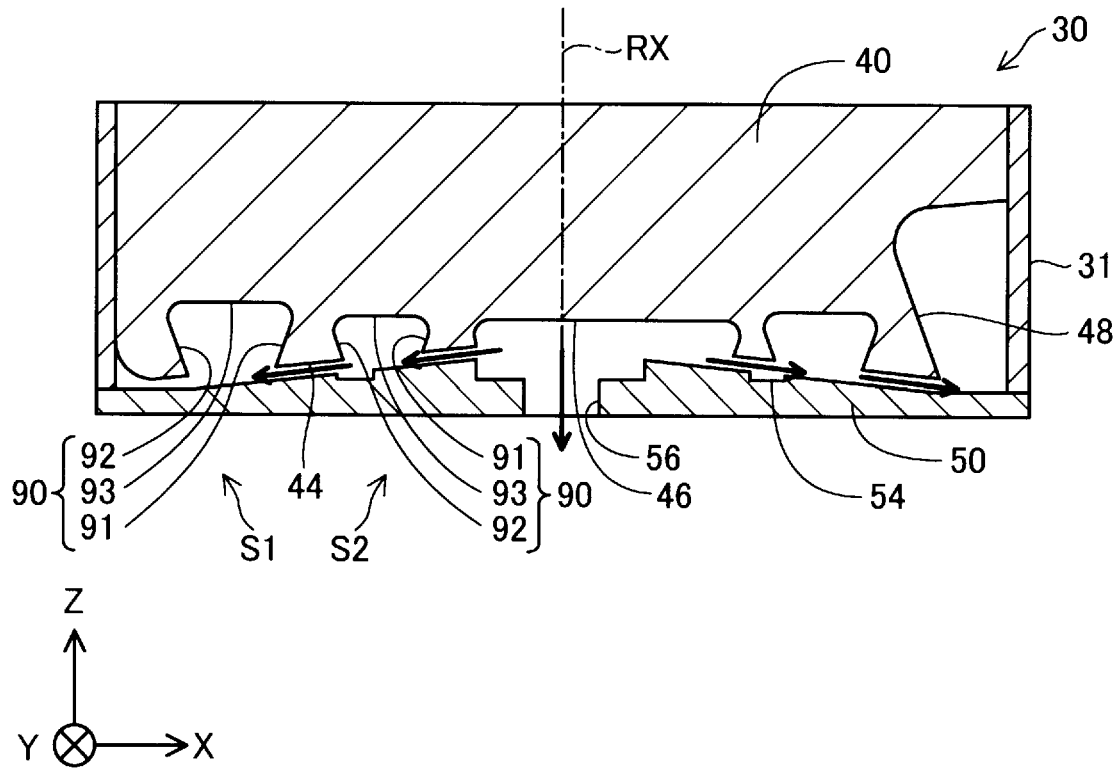
FIG. 7 is a schematic view showing a flow of a modeling material in the plasticization unit according to the first embodiment.

FIG. 7 is a schematic view showing a flow of the modeling material in the plasticization unit 30 according to the present embodiment. FIG. 7 shows the flow of the modeling material in the plasticization unit 30 with arrows. When the flat screw 40 rotates, the modeling material is conveyed along the path of the groove portion 90 from the outer peripheral side of the flat screw 40 toward the central axis RX side. Since the modeling material is collected on the central axis RX side of the flat screw 40, a pressure of the modeling material in the groove portion 90 increases as approaching the central axis RX. Therefore, a part of the modeling material in the groove portion 90 flows backward toward the outer peripheral side of the flat screw 40 through a gap between the ridge portion 44 and the barrel 50. In the present embodiment, as described above, the first side wall portion 91 and the second side wall portion 92 are provided to be inclined with respect to the central axis RX such that the groove width of the groove portion 90 becomes narrower as the distance from the bottom surface portion 93 increases. Therefore, since an interval along a surface of the flat screw 40 between adjacent channels of the groove portion 90 can be set wide, an amount of the modeling material that flows backward through the gap between the ridge portion 44 and the barrel 50 is relatively small.

Figure 8:
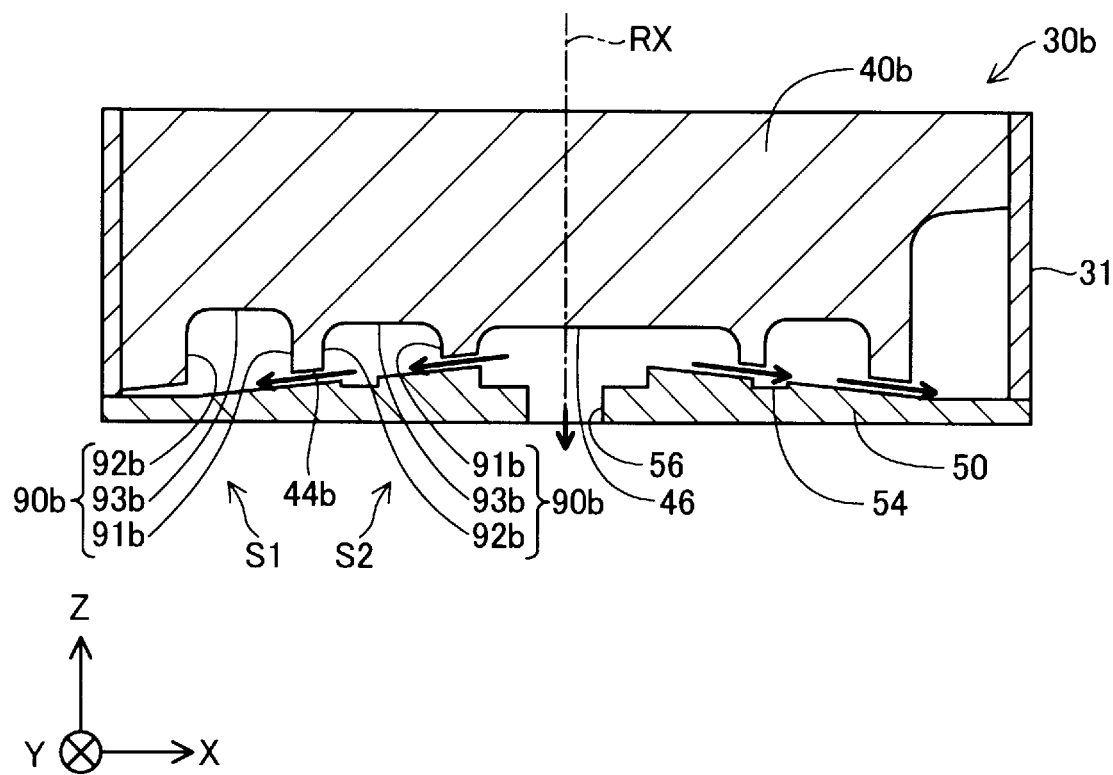
FIG. 8 is a schematic view showing a flow of a modeling material in a plasticization unit according to a comparative example.

FIG. 8 is a schematic view showing a flow of a modeling material in a plasticization unit 30b in a comparative example. In a flat screw 40b of the comparative example shown in FIG. 8, a first side wall portion 91b and a second side wall portion 92b of a groove portion 90b are provided along the central axis RX without being inclined with respect to the central axis RX. A position of a bottom surface portion 93b in the direction along the central axis RX according to the comparative example is set to be the same as the position in the direction along the central axis RX of the bottom surface portion 93 according to the present embodiment. A flow passage cross-sectional area of the groove portion 90b according to the comparative example is set to be the same as a flow passage cross-sectional area of the groove portion 90 according to the present embodiment. Therefore, an interval along a surface of the flat screw 40b between adjacent channels of the groove portion 90b according to the comparative example is set narrower than the interval along the surface of the flat screw 40 between adjacent channels of the groove portion 90 according to the present embodiment shown in FIG. 7. Therefore, an amount of the modeling material that flows backward through a gap between a ridge portion 44b and a barrel 50b according to the comparative example is larger than the amount of the modeling material that flows backward through the gap between the ridge portion 44 and the barrel 50 according to the present embodiment.

According to the three-dimensional modeling device 100 of the present embodiment described above, since the interval along the surface of the flat screw 40 between adjacent channels of the groove portion 90 can be set wide, the amount of the modeling material that flows backward beyond the ridge portion 44 that separates the channels of the groove portion 90 can be reduced. Therefore, since a pressure drop of the modeling material conveyed in the groove portion 90 can be prevented, the pumping of the modeling material from the plasticization unit 30 can be stabilized. Therefore, the discharge of the modeling material from the nozzle 61 can be stabilized. In particular, in the present embodiment, by inclining the first side wall portion 91 and the second side wall portion 92 with respect to the central axis RX, the interval along the surface of the flat screw 40 between adjacent channels of the groove portion 90 can be set wide while securing the flow passage cross-sectional area of the groove portion 90. In addition, since the amount of the modeling material that flows backward can be reduced by setting a wide interval along the surface of the flat screw 40 between adjacent channels of the groove portion 90, it is possible to prevent the modeling material from hardening on the outer peripheral side of the flat screw 40, which is set at a temperature lower than a temperature in the vicinity of the central axis RX, thereby preventing the material to be conveyed in the groove portion 90 from being hindered.

In addition, in the present embodiment, in the outer peripheral portion R1, the interval along the surface of the flat screw 40 between adjacent channels of the groove portion 90 are set large, and in the inner peripheral portion R2 of the flat screw in which the backflow of the modeling material is likely to occur, the interval along the surface of the flat screw 40 between adjacent channels of the groove portion 90 are set large. Therefore, the amount of the modeling material that flows backward beyond the ridge portion 44 that separates the channels of the groove portion 90 can be effectively reduced.

In addition, in the present embodiment, the magnitude of the inclination angle of the first side wall portion 91 with respect to the central axis RX and the magnitude of the inclination angle of the second side wall portion 92 with respect to the central axis RX are set to increase as approaching the central axis RX along the path of the groove portion 90. Therefore, since the interval along the surface of the flat screw 40 between adjacent channels of the groove portion 90 can be set wide as approaching the vicinity of the central axis RX, where the backflow of the modeling material is likely to occur, the amount of the modeling material that flows backward beyond the ridge portion 44 that separates the channels of the groove portion 90 can be effectively reduced.

In addition, in the present embodiment, a depth of the groove portion 90 is to be shallower as approaching the central axis RX along the path of the groove portion 90. Therefore, since the pressure of the modeling material conveyed in the groove portion 90 can be effectively increased, the pumping of the modeling material from the plasticization unit 30 can be stabilized.

In the present embodiment, the ABS resin with the pellet shape is used as the material, whereas as the material used in the modeling unit 200, for example, a material for modeling the three-dimensional modeled object using various materials such as a thermoplastic material, a metal material, a ceramic material, or the like as a main material may also be adopted. Herein, the "main material" refers to a material serving as a main component used for modeling the shape of a three-dimensional modeled object and refers to a material that occupies 50% by weight or more in the three-dimensional modeled object. The modeling material described above includes a material obtained by melting the main material as a simple substance, or a material obtained by melting a part of components contained the main material into a paste shape.

When the thermoplastic material is used as the main material, the modeling material is generated by plasticizing the material in the plasticization unit 30. The "plasticization" means that the thermoplastic material is heated and melted. In addition, "melt" means that the thermoplastic material is heated to a temperature equal to or higher than a glass transition point so as to be softened, thereby exhibiting fluidity.

As the thermoplastic material, for example, any one thermoplastic resin material or a combination of two or more thermoplastic resin materials listed below can be used.

Examples of Thermoplastic Resin Material

General-purpose engineering plastics such as polypropylene resin (PP), polyethylene resin (PE), polyacetal resin (POM), polyvinyl chloride resin (PVC), polyamide resin (PA), acrylonitrile-butadiene-styrene resin (ABS), polylactic acid resin (PLA), polyphenylene sulfide resin (PPS), polycarbonate (PC), modified polyphenylene ether, polybutylene terephthalate, or polyethylene terephthalate, and engineering plastics such as polysulfone, polyether sulfone, polyphenylene sulfide, polyarylate, polyimide, polyamide-imide, polyetherimide, or polyether ether ketone (PEEK)

The thermoplastic material may contain a pigment, a metal, a ceramic, and additives such as a wax, a flame retardant, an antioxidant, and a heat stabilizer. The thermoplastic material is converted into a melted state after being plasticized due to rotation of the flat screw 40 and due to heating of the heater 58 in the plasticization unit 30. In addition, the modeling material generated in this way is discharged from the nozzle hole 62 and thereafter is hardened due to a decrease in the temperature.

It is desirable that the thermoplastic material is injected from the nozzle hole 62 in a state where the material is heated to a temperature equal to or higher than the glass transition point and is completely melted. The "state of being completely melted" refers to a state where no unmelted thermoplastic material is present. For example, when a thermoplastic resin with a pellet shape is used as the material, the "state of being completely melted" refers to a state where no solid object with a pellet shape remains.

The following metal materials, for example, may be used as the main material in the modeling unit 200 instead of the above-described thermoplastic material. In this case, it is desirable that the following metal material is formed into a powder material, a component that is melted at the time of generating the modeling material is mixed with the powder material, and then the mixed material is added into the plasticization unit 30.

Examples of Metal Material

A single metal of magnesium (Mg), iron (Fe), cobalt (Co), chromium (Cr), aluminum (Al), titanium (Ti), copper (Cu), nickel (Ni), or an alloy containing one or more of the metals.

Examples of Alloy

Maraging steel, stainless steel, cobalt chromium molybdenum, titanium alloy, nickel alloy, aluminum alloy, cobalt alloy, cobalt chromium alloy In the modeling unit 200, the ceramic material can be used as the main material instead of the above-described metal materials. As the ceramic material, for example, oxide ceramics such as silicon dioxide, titanium dioxide, aluminum oxide, and zirconium oxide, and non-oxide ceramics such as aluminum nitride may be used. When the metal material or the ceramic material as described above is used as the main material, the modeling material disposed on the stage 300 may be hardened by, for example, irradiating with a laser and sintering with hot air or the like.

The powder material of the metal material or the ceramic material that is added into the material supply unit 20 may be a mixed material obtained by mixing a plurality of types of powders of a single metal, the alloy and the ceramic material. In addition, the powder material of the metal material or the ceramic material may be coated with, for example, the thermoplastic resin as exemplified above, or a thermoplastic resin other than the thermoplastic resin. In this case, the thermoplastic resin may be melted to have fluidity in the plasticization unit 30.

The following solvents, for example, may be added to the powder material of the metal material or the ceramic material that is added into the material supply unit 20. One solvent or a combination of two or more solvents selected from the following solvents may be used.

Examples of Solvent

Water; (poly) alkylene glycol monoalkyl ethers such as ethylene glycol monomethyl ether, ethylene glycol monoethyl ether, propylene glycol monomethyl ether, and propylene glycol monoethyl ether; acetate esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as ethanol, propanol, and butanol; tetraalkylammonium acetates; sulfoxide-based solvents such as dimethyl sulfoxide and diethyl sulfoxide; pyridine-based solvents such as pyridine, 7-picoline, and 2,6-lutidine; tetraalkylammonium acetates (such as tetrabutylammonium acetate); ionic liquids such as butyl carbitol acetate, and the like In addition, the following binders, for example, may be added to the powder material of the metal material or the ceramic material that is added into the material supply unit 20.

Examples of Binder

Acrylic resin, epoxy resin, silicone resin, cellulose resin or other synthetic resins, or polylactic acid (PLA), polyamide (PA), polyphenylene sulfide (PPS), polyether ether ketone (PEEK) or other thermoplastic resins.

B. Second Embodiment

Figure 9:
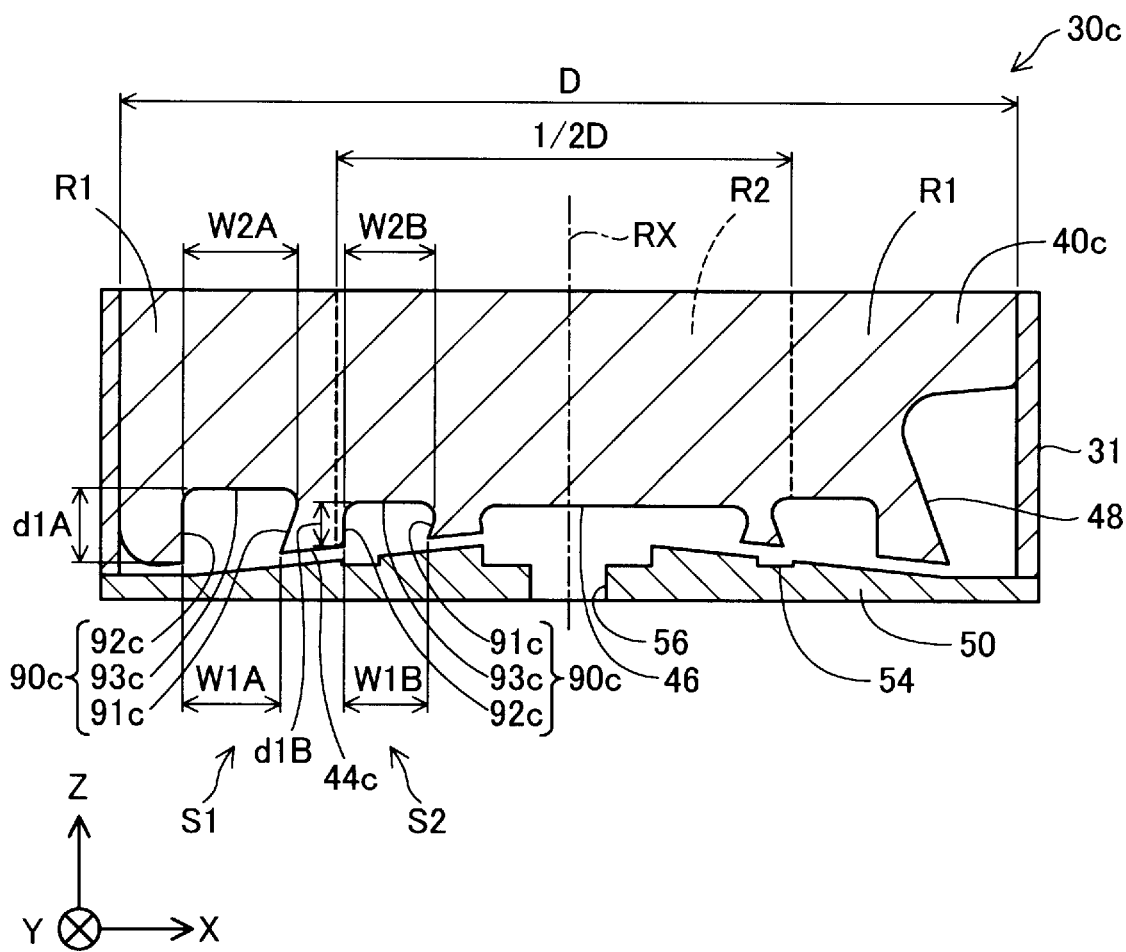
FIG. 9 is a cross-sectional view showing a configuration of a plasticization unit according to a second embodiment.

FIG. 9 is a schematic view showing a configuration of a plasticization unit 30c in a three-dimensional modeling device 100c of a second embodiment. In the second embodiment, an aspect of a groove portion 90c of a flat screw 40c is different from that of the first embodiment. Other configurations are the same as those of the first embodiment shown in FIG. 1, unless otherwise specified. In FIG. 9, a boundary line between the outer peripheral portion R1 and the inner peripheral portion R2 is shown with a broken line.

In the flat screw 40c according to the present embodiment, a first side wall portion 91c is provided to be inclined with respect to the central axis RX so as to be more distant from the central axis RX as a distance from a bottom surface portion 93c increases, and a second side wall portion 92c is provided along the central axis RX. That is, a degree of inclination of the second side wall portion 92c with respect to the central axis RX is set to be smaller than a degree of inclination of the first side wall portion 91c with respect to the central axis RX. As long as the degree of inclination of the second side wall portion 92c with respect to the central axis RX is within a range smaller than the degree of inclination of the first side wall portion 91c with respect to the central axis RX, the second side wall portion 92c may be provided to be inclined with respect to the central axis RX so as to be more distant from the central axis RX as the distance from the bottom surface portion 93c increases, or the second side wall portion 92c may be provided to be inclined with respect to the central axis RX so as to approach the central axis RX as the distance from the bottom surface portion 93c increases.

According to the three-dimensional modeling device 100c of the present embodiment described above, a flow passage cross-sectional area in the vicinity of the second side wall portion 92c can be ensured to be large by setting a small degree of inclination of the second side wall portion 92c, which has a large circumferential speed due to rotation of the flat screw 40c. Therefore, in the groove portion 90c in the vicinity of the second side wall portion 92c, it is possible to effectively convey and plasticize the material. In addition, an interval along a surface of the flat screw 40c between channels of the groove portion 90c can be set large by setting a large degree of inclination of the first side wall portion 91c, which has a small circumferential speed due to the rotation of the flat screw 40c. Therefore, an amount of the modeling material that flows backward beyond a ridge portion 44c that separates the channels of the groove portion 90c can be reduced.

C. Third Embodiment

Figure 10:
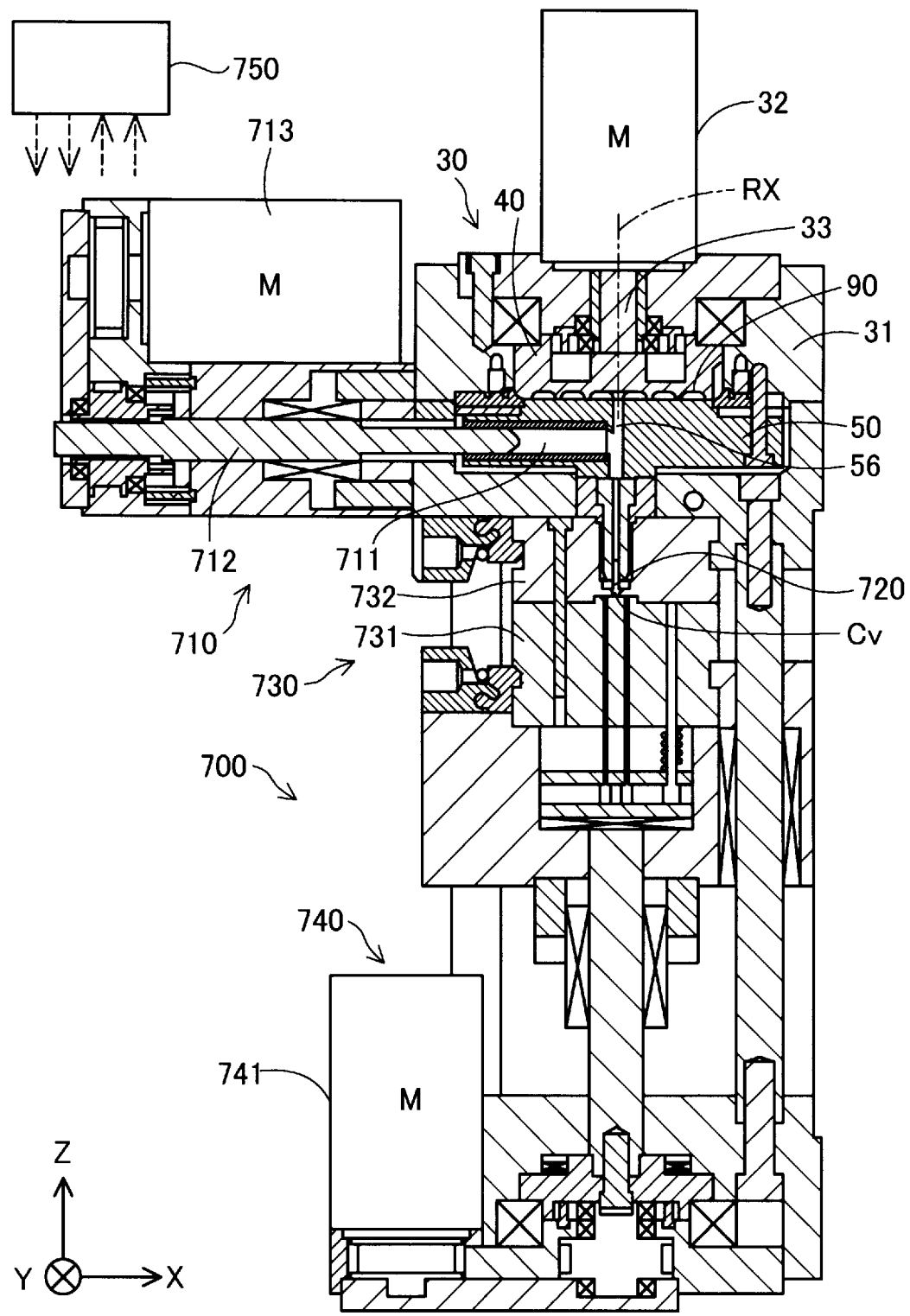
FIG. 10 is a schematic view showing a schematic configuration of an injection molding device according to a third embodiment.

FIG. 10 is a schematic view showing a schematic configuration of an injection molding device 700 according to a third embodiment. The injection molding device 700 of the present embodiment includes the plasticization unit 30 described in the first embodiment, an injection control mechanism 710, a nozzle 720, a mold portion 730, and a mold clamping device 740.

As described in the first embodiment, the plasticization unit 30 includes the flat screw 40 and the barrel 50. The specific configurations of the flat screw 40 and the barrel 50 are the same as those of the flat screw 40 and the barrel 50 of the first embodiment. Under the control of a control unit 750, the plasticization unit 30 plasticizes at least a part of a material supplied to the groove portion 90 of the flat screw 40, generates a molten material with a paste shape having fluidity, and guides the molten material from the discharge port 56 to the injection control mechanism 710.

The injection control mechanism 710 includes an injection cylinder 711, a plunger 712, and a plunger driving unit 713. The injection control mechanism 710 has a function of injecting the molten material in the injection cylinder 711 into a cavity Cv to be described later. The injection control mechanism 710 controls an injection amount of the molten material from the nozzle 720 under the control of the control unit 750. The injection cylinder 711 is a substantially cylindrical member coupled to the discharge port 56 of the barrel 50, and includes the plunger 712 therein. The plunger 712 slides inside the injection cylinder 711, and pumps the molten material in the injection cylinder 711 to the nozzle 720 side coupled to the plasticization unit 30. The plunger 712 is driven by the plunger driving unit 713 configured with a motor.

The mold portion 730 includes a movable mold 731 and a fixed mold 732. The movable mold 731 and the fixed mold 732 are provided to face each other, and the cavity Cv, which is a space corresponding to a shape of a molded article, is interposed therebetween. The molten material is pumped to the cavity Cv by the injection control mechanism 710, and is injected through the nozzle 720.

The mold clamping device 740 includes a mold driving unit 741, and has a function of opening and closing the movable mold 731 and the fixed mold 732. Under the control of the control unit 750, the mold clamping device 740 drives the mold driving unit 741 to move the movable mold 731 to open and close the mold portion 730.

As described above, since the injection molding device 700 of the third embodiment includes the plasticization unit 30 having the same configuration as that of the first embodiment, pumping of the molten material from the plasticization unit 30 can be stabilized. Therefore, injection of the molten material from the nozzle 720 can be stabilized. The injection molding device 700 may be provided with the plasticization unit 30c having the same configuration as that of the second embodiment, instead of the plasticization unit 30 having the same configuration as that of the first embodiment.

D. Other Embodiments (D1) In the three-dimensional modeling device 100, 100c of each of the above-described embodiments, in the outer peripheral portion R1 and the inner peripheral portion R2 of the flat screw 40, 40c, the groove width of the groove portion 90, 90c is set to be narrower as the distance from the bottom surface portion 93, 93c increases. On the other hand, in the flat screw 40, 40c, the groove width of the groove portion 90, 90c may be set to be narrower as the distance from the bottom surface portion 93, 93c increases in the outer peripheral portions R1, and the groove width of the groove portion 90, 90c may not be set to be narrower as the distance from the bottom surface portion 93, 93c increases in the inner peripheral portion R2. In addition, in the flat screw 40, 40c, the groove width of the groove portion 90, 90c may be set to be narrower as the distance from the bottom surface portion 93, 93c increases in the inner peripheral portions R2, and the groove width of the groove portion 90, 90c may not be set to be narrower as the distance from the bottom surface portion 93, 93c increases in the outer peripheral portions R1.

(D2) In the three-dimensional modeling device 100, 100c of each of the above-described embodiments, the flat screw 40, 40c is set such that the magnitude of the inclination angle of the first side wall portion 91, 91c with respect to the central axis RX and the magnitude of the inclination angle of the second side wall portion 92, 92c with respect to the central axes RX increase as approaching the central axis RX along a path of the groove portion 90. On the other hand, at least either one of the magnitude of the inclination angle of the first side wall portion 91, 91c with respect to the central axis RX and the magnitude of the inclination angle of the second side wall portion 92, 92c with respect to the central axis RX may be set to be smaller as approaching the central axis RX along the path of the groove portion 90, 90c. In addition, at least either one of the magnitude of the inclination angle of the first side wall portion 91, 91c with respect to the central axis RX and the magnitude of the inclination angle of the second side wall portion 92, 92c with respect to the central axis RX may be set to a constant inclination angle along the groove portion 90, 90c.

(D3) In the three-dimensional modeling device 100, 100c of each of the above-described embodiments, the bottom surface portion 93, 93c is provided such that the groove depth becomes continuously shallower as approaching the central axis RX along the groove portion 90, 90c of the flat screw 40, 40c. On the other hand, the bottom surface portion 93, 93c may be provided such that the groove depth becomes continuously deeper as approaching the central axis RX along the groove portion 90, 90c of the flat screw 40, 40c. In addition, the bottom surface portion 93, 93c may be provided such that the groove depth of the groove portion 90, 90c is a constant depth along the path of the groove portion 90.

(D4) In the three-dimensional modeling device 100, 100c of each of the above-described embodiments, the first side wall portions 91 and the second side wall portions 92 are provided such that the groove width becomes continuously narrower as approaching the central axis RX along the path of the groove portion 90 of the flat screw 40, 40c. On the other hand, the first side wall portion 91 and the second side wall portion 92 may be provided such that the groove width is a constant width along the path of the groove portion 90 of the flat screw 40, 40c. For example, the minimum groove width W1B at the portion S2 may be the same as the minimum groove width W1A at the portion S1 where a distance from the central axis RX is larger than the that from the portion S2, and the maximum groove width W2B at the portion S2 may be the same as the maximum groove width W2A at the portion S1.

E. Other Aspects

The present disclosure is not limited to the embodiments described above, and can be implemented in various aspects without departing from the scope of the present disclosure. For example, the present disclosure can be implemented by the following aspects. In order to solve apart or all of the problems to be solved of the present disclosure, or to achieve a part or all of the effects of the present disclosure, technical characteristics in the above embodiments corresponding to the technical characteristics in each of the embodiments to be described below can be appropriately replaced or combined. In addition, when the technical characteristics are not described as essential in the present description, the technical characteristics can be appropriately deleted.

(1) According to the first aspect of the present disclosure, a plasticization device configured to plasticize a material into a molten material is provided. The plasticization device includes a screw configured to rotate around a rotation axis and including a groove forming surface on which a groove channel in which a groove extends spirally is formed; a heating unit configured to heat the material supplied to the groove channel; and a barrel including a facing surface that faces the groove forming surface and that is provided with a discharge port through which the molten material is to be discharged due to rotation of the screw and due to heating of the heating unit. The groove is defined by a first side wall portion, a second side wall portion provided at a position farther from the rotation axis than the first side wall portion, and a bottom surface portion coupled between the first side wall portion and the second side wall portion. The groove of the groove channel has an interval between the first side wall portion and the second side wall portion that becomes narrower as a distance from the bottom surface portion along the rotation axis increases.

According to the plasticization device of the aspect, since the interval along the surface of the screw between adjacent channels of the groove portion can be set large, the amount of the molten material that flows backward beyond the side wall portions defining the groove can be reduced. Therefore, since pressure drop of the molten material conveyed in the groove can be prevented, pumping of the molten material from the plasticization device can be stabilized.

(2) In the plasticization device of the aspect, a degree of inclination of the first side wall portion with respect to the rotation axis may be greater than a degree of inclination of the second side wall portion with respect to the rotation axis.

According to the plasticization device of the aspect, the material is effectively plasticized and conveyed in the vicinity of the second side wall portion by setting a small degree of inclination of the second side wall portion, which has a large circumferential speed due to rotation of the screw, and since the interval along the surface of the screw between adjacent channels of the groove portion can be set large by setting a large degree of inclination of the first side wall portion, which has a small circumferential speed due to the rotation of the screw, the amount of the molten material that flows backward beyond the side wall portions defining the groove can be reduced.

(3) In the plasticization device of the aspect, the screw may include a cylindrical inner peripheral portion centered on the rotation axis and a cylindrical outer peripheral portion surrounding the inner peripheral portion, a diameter of the inner peripheral portion may be half a diameter of the screw. The groove channel may include, in the inner peripheral portion, the groove having an interval between the first side wall portion and the second side wall portion that becomes narrower as the distance from the bottom surface portion along the rotation axis increases.

According to the plasticization device of the aspect, by setting a large interval along the surface of the screw between adjacent channels of the groove in the inner peripheral portion in which backflow of the molten material is likely to occur, the amount of the molten material that flows backward beyond the side wall portions defining the groove can be effectively reduced.

(4) In the plasticization device of the aspect, at least either one of the degree of inclination of the first side wall portion with respect to the rotation axis and the degree of inclination of the second side wall portion with respect to the rotation axis increases as approaching the rotation axis along the groove channel.

According to the plasticization device of the aspect, by setting a larger interval along the surface of the screw between adjacent channels of the groove as approaching the vicinity of the rotation axis in which the backflow of the molten material is likely to occur, the amount of the molten material that flows backward beyond the side wall portions defining the groove can be effectively reduced.

(5) In the plasticization device of the aspect, a depth of the groove becomes shallower as approaching the rotation axis along the groove channel.

According to the plasticization device of the aspect, since the pressure of the molten material conveyed in the groove can be effectively increased, the pumping of the molten material from the plasticization device can be stabilized.

(6) According to the second aspect of the present disclosure, a three-dimensional modeling device is provided. The three-dimensional modeling device includes a plasticization unit configured to plasticize a material into a molten material; and a nozzle configured to discharge the molten material supplied from the plasticization unit toward a stage. The plasticization unit includes: a screw configured to rotate around a rotation axis and including a groove forming surface on which a groove channel in which a groove extends spirally is formed; a heating unit configured to heat the material supplied to the groove channel; and a barrel including a facing surface that faces the groove forming surface and that is provided with a discharge port through which the molten material is to be discharged due to rotation of the screw and due to heating of the heating unit. The groove is defined by a first side wall portion, a second side wall portion provided at a position farther from the rotation axis than the first side wall portion, and a bottom surface portion coupled between the first side wall portion and the second side wall portion. The groove of the groove channel has an interval between the first side wall portion and the second side wall portion that becomes narrower as a distance from the bottom surface portion along the rotation axis increases.

According to the three-dimensional modeling device of the aspect, since the interval along the surface of the screw between adjacent channels of the groove portion can be set large, an amount of the molten material that flows backward beyond the side wall portions defining the groove can be reduced. Therefore, since pressure drop of the molten material conveyed in the groove can be prevented, the molten material can be stably supplied from the plasticization unit to the nozzle.

(7) According to the third aspect of the present disclosure, a injection molding device is provided. The injection molding device includes: a plasticization unit configured to plasticize a material into a molten material; and a nozzle configured to inject the molten material supplied from the plasticization unit into a mold. The plasticization unit includes: a screw configured to rotate around a rotation axis and including a groove forming surface on which a groove channel in which a groove extends spirally is formed; a heating unit configured to heat the material supplied to the groove channel; and a barrel including a facing surface that faces the groove forming surface and that is provided with a discharge port through which the molten material is to be discharged due to rotation of the screw and due to heating of the heating unit. The groove is defined by a first side wall portion, a second side wall portion provided at a position farther from the rotation axis than the first side wall portion, and a bottom surface portion coupled between the first side wall portion and the second side wall portion. The groove of the groove channel has an interval between the first side wall portion and the second side wall portion that becomes narrower as a distance from the bottom surface portion along the rotation axis increases.

According to the injection molding device of the aspect, since the interval along the surface of the screw between adjacent channels of the groove portion can be set large, an amount of the molten material that flows backward beyond the side wall portions defining the groove can be reduced. Therefore, since pressure drop of the molten material conveyed in the groove can be prevented, the molten material can be stably supplied from the plasticization unit to the nozzle.

The present disclosure may be implemented in various aspects other than the plasticization device. For example, the present disclosure can be implemented in the aspect of the three-dimensional modeling device, the injection molding device, the screw, and the like.

What is claimed is:

1. A plasticization device configured to plasticize a material into a molten material, the plasticization device comprising:
   a screw configured to rotate around a rotation axis and including a groove forming surface in which a groove is formed, the groove extending spirally, the rotation axis extending along a first direction, the groove being recessed from the groove forming surface toward an opposite surface of the screw with respect to the groove forming surface;
   a heater configured to heat the material supplied to the groove; and
   a barrel including a facing surface that faces the groove forming surface and that is provided with a discharge port through which the molten material is discharged due to rotation of the screw and due to heating of the heater, wherein
   the groove is configured with a first inner side surface, a second inner side surface inwardly directly facing the first inner side surface, and a bottom surface coupled between the first inner side surface and the second inner side surface in a first part of a cross section of the screw along a plane extending along the first direction and having the rotation axis,
   the first inner side surface and the second inner side surface are inclined with respect to the rotation axis in the first part of the cross section of the screw,
   a length of the bottom surface in the first part of the cross section of the screw is larger than a distance between a first point and a second point in the first part of the cross section of the screw, and
   a lower end of the first inner side surface and the groove forming surface are connected at the first point in the first part of the cross section of the screw, and a lower end of the second inner side surface and the groove forming surface are connected at the second point in the first part of the cross section of the screw.

2. The plasticization device according to claim 1, wherein the first inner side surface is located closer to the rotation axis than the second inner side surface in the first part of the cross section of the screw, and
   a degree of inclination of the first inner side surface with respect to the rotation axis in the first part of the cross section of the screw is greater than a degree of inclination of the second inner side surface with respect to the rotation axis in the first part of the cross section of the screw.

3. The plasticization device according to claim 1, wherein the screw includes a cylindrical inner peripheral portion centered on the rotation axis and a cylindrical outer peripheral portion surrounding the cylindrical inner peripheral portion,
   a diameter of the cylindrical inner peripheral portion is half a diameter of the screw, and
   the cylindrical inner peripheral portion of the screw includes the first inner side surface, the second inner side surface, and the bottom surface of the first part of the cross section of the screw.

4. The plasticization device according to claim 1, wherein the groove is configured with a third inner side surface, a fourth inner side surface inwardly directly facing the third inner side surface, and another bottom surface coupled between the third inner side surface and the fourth inner side surface in a second part of the cross section of the screw along the plane extending along the first direction and having the rotation axis,
   the third inner side surface is located closer to the rotation axis than the fourth inner side surface in the second part of the cross section of the screw,
   the first part is located closer to the rotation axis than the second part in the cross section of the screw, and
   a degree of inclination of the first inner side surface with respect to the rotation axis in the first part of the cross section of the screw is greater than a degree of inclination of the third inner side surface with respect to the rotation axis in the second part of the cross section of the screw, or a degree of inclination of the second inner side surface with respect to the rotation axis in the first part of the cross section of the screw is greater then a degree of inclination of the fourth inner side surface with respect to the rotation axis in the second part of the cross section of the screw.

5. The plasticization device according to claim 1, wherein the groove is configured with a third inner side surface, a fourth inner side surface inwardly directly facing the third inner side surface, and another bottom surface coupled between the third inner side surface and the fourth inner side surface in a second part of the cross section of the screw along the plane extending along the first direction and having the rotation axis,
   the first part is located closer to the rotation axis than the second part in the cross section of the screw, and
   a depth of the groove in the first part of the cross section of the screw shallower than a depth of the groove in the second part of the cross section of the screw.

6. A three-dimensional modeling device, comprising:
   a plasticization device configured to plasticize a material into a molten material; and
   a nozzle configured to discharge the molten material supplied from the plasticization device toward a stage, wherein the plasticization device includes:
a screw configured to rotate around a rotation axis and including a groove forming surface in which a groove is formed, the groove extending spirally, the rotation axis extending along a first direction, the groove being recessed from the groove forming surface toward an opposite surface of the screw with respect to the groove forming surface;
a heater configured to heat the material supplied to the groove; and
a barrel including a facing surface that faces the groove forming surface and that is provided with a discharge port through which the molten material is supplied to the nozzle due to rotation of the screw and due to heating of the heater,
the groove is configured with a inner side surface, a second inner side surface inwardly directly facing the first side surface, and a bottom surface coupled between the first inner side surface and the second inner side surface in a first part of a cross section of the screw along a plane extending along the first direction and having the rotation axis,
the first inner side surface and the second inner side surface are inclined with respect to the rotation axis in the first part of the cross section of the screw,
a length of the bottom surface in the first part of the cross section of the screw is larger than a distance between a first point and a second point in the first part of the cross section of the screw, and
a lower end of the first inner side surface and the groove forming surface are connected at the first point in the first part of the cross section of the screw, and a lower end of the second inner side surface and the groove forming surface are connected at the second point in the first part of the cross section of the screw.

7. The three-dimensional modeling device according to claim 6,
wherein the first inner side surface is located closer to the rotation axis than the second inner side surface in the first part of the cross section of the screw, and
a degree of inclination of the first inner side surface with respect to the rotation axis in the first part of the cross section of the screw is greater than a degree of inclination of the second inner side surface with respect to the rotation axis in the first part of the cross section of the screw.

8. The three-dimensional modeling device according to claim 6,
wherein the screw includes a cylindrical inner peripheral portion centered on the rotation axis and a cylindrical outer peripheral portion surrounding the cylindrical inner peripheral portion,
a diameter of the cylindrical inner peripheral portion is half a diameter of the screw, and
the cylindrical inner peripheral portion of the screw includes the first inner side surface, the second inner side surface, and the bottom surface of the first part of the cross section of the screw.

9. The three-dimensional modeling device according to claim 6,
wherein the groove is configured with a third inner side surface, a fourth inner side surface inwardly directly facing the third inner side surface, and another bottom surface coupled between the third inner side surface and the fourth inner side surface in a second part of the cross section of the screw along the plane extending along the first direction and having the rotation axis,
the third inner side surface is located closer to the rotation axis than the fourth inner side surface in the second part of the cross section of the screw,
the first part is located closer to the rotation axis than the second part in the cross section of the screw, and
a degree of inclination of the first inner side surface with respect to the rotation axis in the first part of the cross section of the screw is greater than a degree of inclination of the third inner side surface with respect to the rotation axis in the second part of the cross section of the screw, or a degree of inclination of the second inner side surface with respect to the rotation axis in the first part of the cross section of the screw is greater than a degree of inclination of the fourth inner side surface with respect to the rotation axis in the second part of the cross section of the screw.

10. The three-dimensional modeling device according to claim 6,
wherein the groove is configured with a third inner side surface, a fourth inner side surface inwardly directly facing the third inner side surface, and another bottom surface coupled between the third inner side surface and the fourth inner side surface in a second part of the cross section of the screw along the plane extending along the first direction and having the rotation axis,
the first part is located closer to the rotation axis than the second part in the cross section of the screw, and
a depth of the groove in the first part of the cross section of the screw shallower than a depth of the groove in the second part of the cross section of the screw.

11. An injection molding device, comprising:
a plasticization device configured to plasticize a material into a molten material; and
a nozzle configured to inject the molten material supplied from the plasticization device into a mold, wherein
the plasticization device includes:
a screw configured to rotate around a rotation axis and including a groove forming surface in which groove is formed, the groove extending spirally, the rotation axis extending along a first direction, the groove being recessed from the groove forming surface toward an opposite surface of the screw with respect to the groove forming surface;
a heater configured to heat the material supplied to the groove; and
a barrel including a facing surface that faces the groove forming surface and that is provided with a discharge port through which the molten material is supplied to the nozzle due to rotation of the screw and due to heating of the heater,
the groove is configured with a first inner side surface, a second inner side surface inwardly directly facing the first inner side surface, and a bottom surface coupled between the first inner side surface and the second inner side surface in a first part of a cross section of the screw along a plane extending along the first direction and having the rotation axis,
the first inner side surface and the second inner side surface are inclined with respect to the rotation axis in the first part of the cross section of the screw,
a length of the bottom surface in the first part of the cross section of the screw is larger than a distance between a first point and a second point in the first part of the cross section of the screw, and
a lower end of the first inner side surface and the groove forming surface are connected at the first point in the first part of the cross section of the screw, and a lower end of the second inner side surface and the groove forming surface are connected at the second point in the first part of the cross section of the screw.

12. The injection molding device according to claim 11, wherein the first inner side surface is located closer to the rotation axis than the second inner side surface in the first part of the cross section of the screw, and a degree of inclination of the first inner side surface with respect to the rotation axis in the first part of the cross section of the screw is greater than a degree of inclination of the second inner side surface with respect to the rotation axis in the first part of the cross section of the screw.

13. The injection molding device according to claim 11, wherein the screw includes a cylindrical inner peripheral portion centered on the rotation axis and a cylindrical outer peripheral portion surrounding the cylindrical inner peripheral portion, a diameter of the cylindrical inner peripheral portion is half a diameter of the screw, and the cylindrical inner peripheral portion of the screw includes the first inner side surface, the second inner side surface, and the bottom surface of the first part of the cross section of the screw.

14. The injection molding device according to claim 11, wherein the groove is configured with a third inner side surface, a fourth inner side surface inwardly directly facing the third inner side surface, and another bottom surface coupled between the third inner side surface and the fourth inner side surface in a second part of the cross section of the screw along the plane extending along the first direction and having the rotation axis, the third inner side surface is located closer to the rotation axis than the fourth inner side surface in the second part of the cross section of the screw, the first part is located closer to the rotation axis than the second part in the cross section of the screw, and a degree of inclination of the first inner side surface with respect to the rotation axis in the first part of the cross section of the screw is greater than a degree of inclination of the third inner side surface with respect to the rotation axis in the second part of the cross section of the screw, or a degree of inclination of the second inner side surface with respect to the rotation axis in the first part of the cross section of the screw is greater than a degree of inclination of the fourth inner side surface with respect to the rotation axis in the second part of the cross section of the screw.

15. The injection molding device according to claim 11, wherein the groove is configured with a third inner side surface, a fourth inner side surface inwardly directly facing the third inner side surface, and another bottom surface coupled between the third inner side surface and the fourth inner side surface in a second part of the cross section of the screw along the plane extending along the first direction and having the rotation axis, the first part is located closer to the rotation axis than the second part in the cross section of the screw, and a depth of the groove in the first part of the cross section of the screw shallower than a depth of the groove in the second part of the cross section of the screw.

* * * * *